United States Patent [19]

Röhm et al.

[11] Patent Number: 4,877,259

[45] Date of Patent: Oct. 31, 1989

[54] POWER-DRIVEN CHUCK

[75] Inventors: Günter H. Röhm, Sontheim; Karl Pesch, Dillingen/Donau, both of Fed. Rep. of Germany

[73] Assignee: Günter Horst Röhm, Sontheim, Fed. Rep. of Germany

[21] Appl. No.: 147,716

[22] Filed: Jan. 25, 1988

[30] Foreign Application Priority Data

Feb. 11, 1987 [DE] Fed. Rep. of Germany ....... 3704135

[51] Int. Cl.[4] .............................................. B23B 31/16
[52] U.S. Cl. ...................................... 279/123; 279/110
[58] Field of Search ......................... 279/110, 117, 123

[56] References Cited

U.S. PATENT DOCUMENTS

| | | | |
|---|---|---|---|
| 4,026,566 | 5/1977 | Rohm | 279/123 |
| 4,243,237 | 1/1981 | Rohm | 279/110 X |
| 4,270,763 | 6/1981 | Rohm | 279/110 X |
| 4,352,500 | 10/1982 | Blattry et al. | 279/123 X |
| 4,362,306 | 12/1982 | Rohm | 279/123 X |

FOREIGN PATENT DOCUMENTS 2711904  9/1978  Fed. Rep. of Germany ...... 279/110
3510457  7/1986  Fed. Rep. of Germany .

Primary Examiner—Steven C. Bishop
Attorney, Agent, or Firm—Herbert Dubno

[57] ABSTRACT

The clamp jaws radially adjustable by a drive member each comprise a jaw base guided in the chuck body and a mounted jaw member replacably attached with it as well as at least one connecting pin which is mounted pivotable about the pin axis in the jaw base. According to rotary position the attachment between the jaw base and the mounted jaw member is released or locked. At least one control rod guided longitudinally slidable in the jaw base is coupled with the connecting pins by gear teeth so that the motion of the control rods relative to the jaw base converts to a rotation of the connecting pin and vice versa. The feed of the control rods in the jaw base runs parallel to the feed of the jaw base in the chuck body. For the control rod a controlling member is provided by which the control rod is held fixed from motion relative to the chuck body. The jaw base is slidable for rotation of the connecting pins by its drive member with the control rods held fixed in position. Thus with the control rod held fixed the connecting pins are rotated under force by motion of the jaw base.

16 Claims, 7 Drawing Sheets

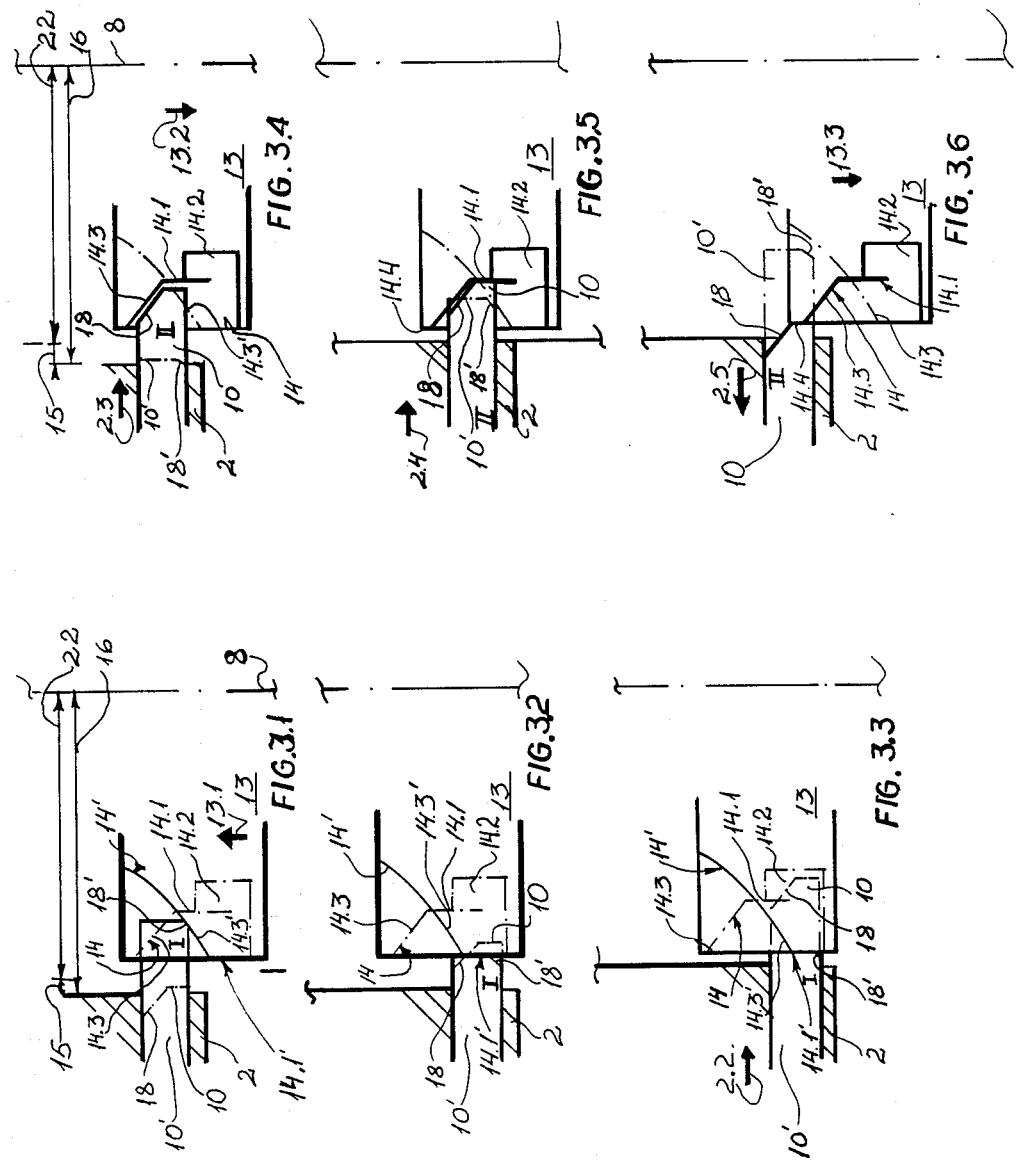

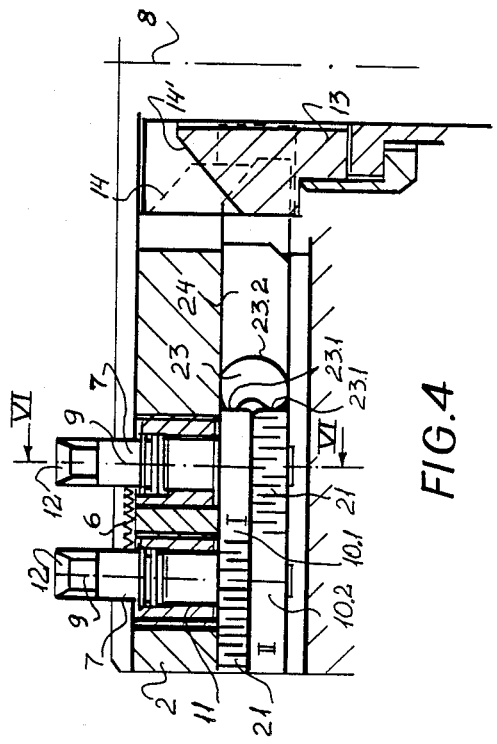

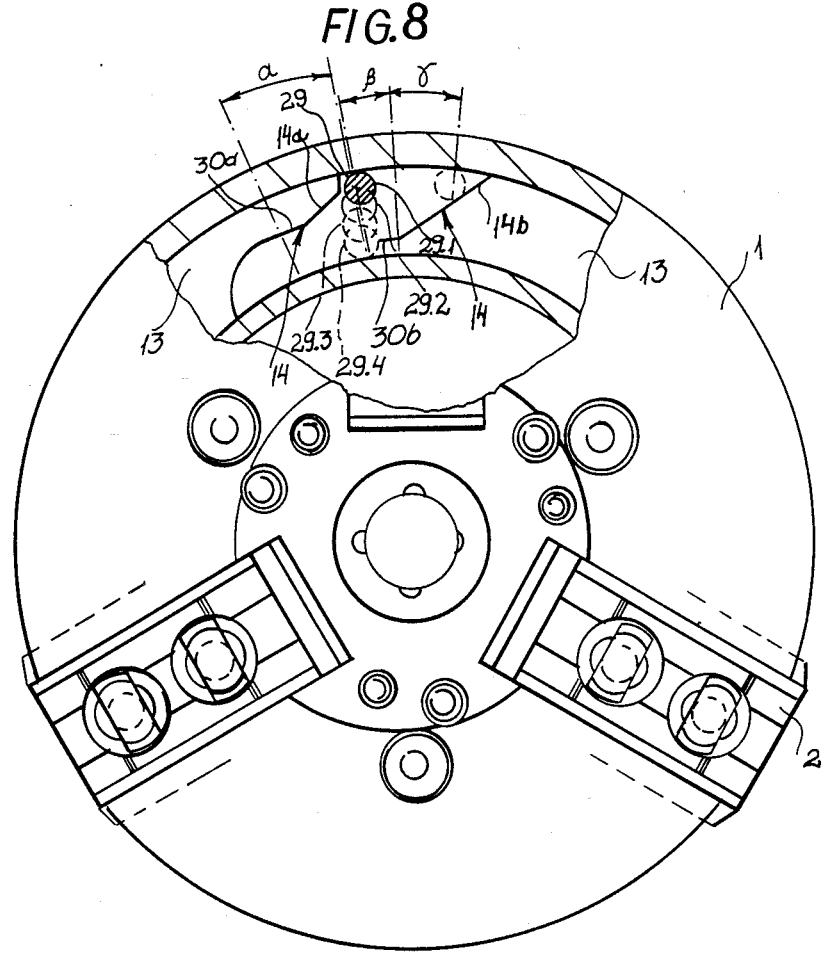

4,877,259

POWER-DRIVEN CHUCK

CROSS REFERENCE TO RELATED APPLICATIONS

This application is related to the commonly owned copending applications: Ser. Nos. 07/050,634 filed 14 May 1987, now U.S. Pat. No. 4,819,319,; 06/921,671 filed 21 October 1986, now U.S. Pat. No. 4,738,187, and 06/841,558 filed 20 March 1986 (U.S. Pat. No. 4,690,416)

FIELD OF THE INVENTION

Our invention relates to a power-driven chuck, especially for the headstock of a lathe or the like. More particularly, the invention relates to a power-driven chuck which can have a plurality of clamp jaws radially adjustable by a drive member, each comprising a jaw base operable by the drive member guided in a chuck body. A replaceable jaw member can be removably attached to each jaw base. At least one connecting pin with a pin axis parallel to the chuck axis is mounted so as to be pivotable about the pin axis in the jaw base and to release or lock the attachment between the jaw base and the mounted jaw member according to its rotary position.

At least one control rod is longitudinally slidable in the jaw base transverse to the pin axis and gear teeth couple the control rod and the connecting pin with each other so that the motion of the control rod relative to the jaw base converts into a rotation of the connecting pin and vice versa.

BACKGROUND OF THE INVENTION

In German Pat. No. 35 10 457 a chuck of this type is described which permits automatic changing of the jaw members with the help of a jaw carrier, which releases the attachment of the jaws by operation of the control rods in the chuck during closing, replaces the replaceable jaw member with a new mounted jaw member and makes the attachment again by fresh operation of the control rods.

One end of each connecting pin is guided in a threaded passage of the jaw base and at the other end has a bolt head which engages in a lock bolt recess in the replaceable jaw member. The bolt head is formed with a lock bolt shoulder projecting out beyond the pin shaft which is smaller in a direction transverse to the pin axis and wider in a direction perpendicular to that direction.

The bolt head is insertable axially in the lock bolt recess in the rotary position of the connecting pin corresponding to the unlocked configuration and is engaged axially with its lock bolt shoulder fitting in the undercut provided in the lock bolt recess in the rotary position corresponding to the locked configuration.

Further the connecting pin has on its portion located in the jaw base, gear teeth to form a pinion and the control rod has transverse gear teeth like those of rack meshing with the teeth of the connecting pin.

The control rods are guided in a tangential direction, also transversely to the chuck axis and to the adjusting direction of the jaw base and are slidable by a push rod operable against the force of restoring spring by the jaw carrier from outside the chuck body and guided axially in the chuck body.

The control rods are engaged with the push rod by a wedgetype force transmission. Axially forcing in the push rod in the chuck body against the restoring force of the restoring spring leads to sliding of the control rods and by the connected rotation of the connecting pins to a locking or unlocking of the replaceable jaw member. On rotation of the connecting pins into their rotary positions corresponding to the locked configuration the lock bolt shoulder of the lock bolt head is positioned behind an undercut in the lock bolt recess and simultaneously clamps the replaceable jaw member against the jaw base because of the axial tightening of the connecting pin in its threaded passage.

The rotation of the connecting pin requires thus a higher force the more the connecting pins are tightened in their threaded passage so that, as a result, for the later phase of the locking process and/or for the first phase of the unlocking process especially a higher applied force is required, if the attachment of the clamp jaw members in the locked configuration is to be sufficiently stable and rigid. To produce this high applied force with the help of the jaw carrier is expensive and troublesome in practice.

OBJECTS OF THE INVENTION

It is an object of our invention to provide an improved power-driven chuck which avoids the latter drawbacks.

It is another object of our invention to provide an improved power-driven chuck in which operating and power-driven components for adjustment of the control rods on the jaw carrier are not needed.

SUMMARY OF THE INVENTION

These objects and others which will become more readily apparent hereinafter are attained in accordance with our invention in a power-driven chuck with a plurality of clamp jaws radially adjustable by a drive member, each comprising a jaw base operable by the drive member guided in a chuck body and a mounted jaw member removably attached to the jaw base and having at least one connecting pin with a pin axis parallel to the chuck axis which is mounted so as to be pivotable about the pin axis in the jaw base and which releases or makes the jaw member attachment between the jaw base and the replaceable jaw member according to rotary position.

At least one control rod guided longitudinally slidably in the jaw base transverse to the pin axis and gear teeth coupling the control rod and the connecting pin with each other are provided so that motion of the control rod relative to the jaw base converts into a rotation of the connecting pin and vice versa.

According to our invention the movement of the control rod in the jaw base is parallel to the displacement of the jaw base in the chuck body, a controlling member is provided for the control rod by which the control rod is fixed relative to motion in the chuck body and the jaw base is slidable by the drive member with the control rod fixed for rotation of the connecting pins.

With our invention the large applied force required at least for a portion of the displacement of the control rod during locking and/or unlocking is applied by the power-driven clamping drive of the chuck itself. When the jaw base is moved by its driving member in a movement similar to the inner or outer clamping of the workpiece and control rod held fixed from sliding, a relative motion of the control rod toward the jaw base occurs causing the rotation of the connecting pins.

As a result in the chuck according to our invention the clamping drive for the clamp jaws acts not only for clamping the workpiece but also at least to finally pull tight and/or initially loosen the locked attachment of the jaw base and the replaceable jaw member.

The chuck can have two connecting pins for each clamp jaw operated by only a single control rod for both connecting pins a mechanical double usage of the one control rod results. To avoid that and to be able to rotate both connecting pins about an equal sized angle and act on them with an equally large force, a single control rod can be provided for each connecting pin.

Both controls rods can be coupled with each other by a force balancing member and by the controlling member joining both control rods are securable in position by the force balancing member. For this purpose the force balancing member can be an equal armed lever arm which is connected pivotally at the ends of its lever arm with both control rods and is connected to a positioning rod on which the controlling member engages guided parallel to the control rods in the jaw base rotatable about the center of the lever.

The force balancing member advantageously can be braced on one end with a front pressing nose against each of the control rods and on the other end is braced against the positioning rod by a cylindrical surface allowing its rotation.

The gear teeth system coupling the control rods with the connecting pins can comprise a pinion on the connecting pin and a strip with gear teeth engaged on it on the control rod (i.e. a rack) so that both control rods are guided directly to each other in the direction of the pin axis. Each have a longitudinal cavity in each control rod which receives the pinion not in engagement with it over the motion path of the control rod. As a result a very compact space saving and particularly rigid arrangement of both control rods with their force balancing member is attained.

In principle in the scope of our invention it is possible to set up the adjusting path of the controlling and/or positioning rod required both for the locking and unlocking of the attachment of the jaw members alone by a correspondingly large radial displacement of the jaw base.

In practice however that great an adjusting path of the jaw base can be connected not only with the most expensive chuck drive but also with much too large radial and axial structural dimensions of the chuck.

Thus it is better to use a conventional small adjusting path for the jaw base member repeatedly consecutively for stepwise motion of the control and/or positioning rods and to keep the required size of the displacement for the control rods and/or the positioning rods within the sum of all small motion steps.

Advantageously the controlling member is a lock bolt guided in the chuck body which in the locked configuration engages with a bolt head fitting in a bolt recess of the control rod or position rod transverse to its guide direction. The jaw base member can then be moved in one direction opposite the fixed control or positioning rods and subsequently together with the control or positioning rods again released from the lock bolt in another direction.

An increasingly large displacement of the control or positioning rod with repetition number relative to the jaw base results on repetition. A particularly advantageous construction has the control rod or positioning rod guided in a linear groove of the jaw base member opening into the chuck body and provided with a toothed strip forming a lock bolt receptacle in side of the linear groove opening into the chuck body.

The lock bolt can be a power-driven bolt slidable to and fro in its longitudinal direction and which has transverse gear teeth on its front which i the bolt head facing the control rod or the positioning rod fitting into the rack thereof.

Instead of time-consuming stepwise displacement of the control or positioning rods by multiple jaw base displacements it is usually better to use the clamping drive of the jaw base only for large force applications required for tightening or loosening the locked state of the jaw member attachment and besides to call upon the controlling member additionally for rod driving for displacement ranges or strokes of the control or adjusting rods required for substantially reduced forces.

Advantageously the controlling member being a power-driven movable controlling member guided transversely in the guide direction of the control rod or positioning rod in the chuck body which has a cam extending along its path of displacement which forms a stop for the control rod or positioning rod and by which on adjusting the controlling member the control rod or the positioning rod is slidable relative to the jaw base member held fixed by its drive member.

According to another feature of our invention the controlling member can be a ring disk which is mounted in a concentric circular slot of the chuck body rotatable about the chuck axis so that the circular slot is open to the jaw base.

Also on each jaw base the control rod or positioning rod is guided in a rod groove open to the ring disk and the ring disk has a cam which contacts the control rod or the positioning rod with a stop piece on its side facing the jaw base member. Rotation of the controlling member then results in the sliding of the control or positioning rod according to the course of the cam.

In particular in an especially desirable embodiment the controlling member in a predetermined rotary position provides an open passage for the stop piece running in the displacement direction of the control rod or positioning rod. In this open passage the cam having two cam legs can rotate in whatever rotation direction of the controlling member is established.

One cam leg controls the locking motion while the other cam leg controls the unlocking motion of the control rod or positioning rod. Each of these cam legs has a stop surface on which the control rod or the positioning rod is held fixed in the direction of the locking motion or the unlocking motion.

In the rotary position of the controlling member forming the open passage for the stop piece the jaw base member can be shifted for workpiece clamping unimpaired by the controlling member or its cam. If however the controlling member is rotated from this position, according to the angle of rotation, the control rod or positioning rod can be pushed without much force into the locked or unlocked direction or can be held fixed on the contacting surface formed by the cam leg to strongly tighten the attachment of the jaw members in the one or the other direction or to loosen the tightened between base and removable piece attachment.

In another embodiment of our invention instead of the rotary drive of the controlling member of the previously described example a simpler axial drive for the controlling member is provided. The design of this axial drive is such that the controlling member is a control piston guided axially and concentrically in the chuck body so that two control rods or positioning rods moving oppositely to each other on the connecting pins lying opposite each other are provided for each jaw base.

The controlling member for each of the control rods or the positioning rods has a single cam which contacts one of the control rods or positioning rods only in the unlocking process, the other only in the locking process with their radial inner rod ends.

Thus the control rods or the position rods are acted on by the controlling member as a result always only under pressure and the locking and unlocking motion of the jaw base is always radially inwards which directs the control rods or positioning rods radially outwards.

To avoid limiting the clamping displacement of the jaw bases radially inwardly by contact of the control or positioning rods on the controlling member, the cam and the stop formed by it, which contacts the one or the other control rod or positioning rod in the radially inwardly direction locking or unlocking motion of the jaw base, has a radial spacing from the chuck which is somewhat smaller than the smallest spacing of the jaw base from the chuck axis occuring in the workpiece clamping.

Then the displacement which the jaw base must perform for strongly locking or unlocking the attachment of the jaw members is somewhat greater than the largest allow displacement in workpiece clamping.

The controlling member can be positioned between the control rods or the positioning rods of all the jaw bases in the chuck body with radial play for force balancing and is pushed into a central passage with that radial play prevented only in its axial position corresponding to the completely released jaw member attachment.

The exclusion of radial play of the controlling member in its axial position corresponding to the completely released jaw connection has the purpose of guaranteeing that on each of the jaw bases the connecting pins are located exactly in the rotary position allowing the axial removal or mounting of the replaceable jaw member.

To provide simple operation on opening or closing of the jaw member attachment the contacting surface on the cam for the locking process and on the cam for the unlocking process corresponds to a recess for free entrance of the control or positioning rod associated with it. The contacting surface of the cam connected to this recess is at least radially further out than at least that displacement which the clamp jaw members perform for releasing the jaw member attachment. Then the contacting surfaces of both cams holding the control or positioning rods press close to each other in the axial sliding direction of the controlling member so that its displacement is least when, starting from the locked state, the control or positioning rod causing the unlocking is brought to the contacting surface associated with it to be fixed in position.

The cams can have segments formed like planar wedge surfaces inclined toward the chuck axis. These segments contact the control or positioning rod ends with appropriately slanting surfaces. A wedgetype force transmission is provided in this way between the controlling member and the control or positioning rods which allows optimum force and displacement conversion.

BRIEF DESCRIPTION OF THE DRAWING

The above and other objects, features and advantages of our invention will become more readily apparent from the following specific description, reference being made to the accompanying drawing in which:

FIGS. 3.1 to 3.6 collectively referred to as FIG. 3, are enlarged schematic action views of the portion III of the chuck in FIG. 1;

FIG. 4 is a cross sectional view through another embodiment of a chuck according to our invention;

FIG. 5 is plan view of the chuck of FIG. 4 similar to the view of FIG. 2;

FIG. 6 is a cross sectional view taken along the line VI—VI of FIG. 4,

FIG. 8 is a partially broken away front view of the chuck according to our invention, with the section being taken along line VIII—VIII in FIG. 7;

SPECIFIC DESCRIPTION

Figure 1:
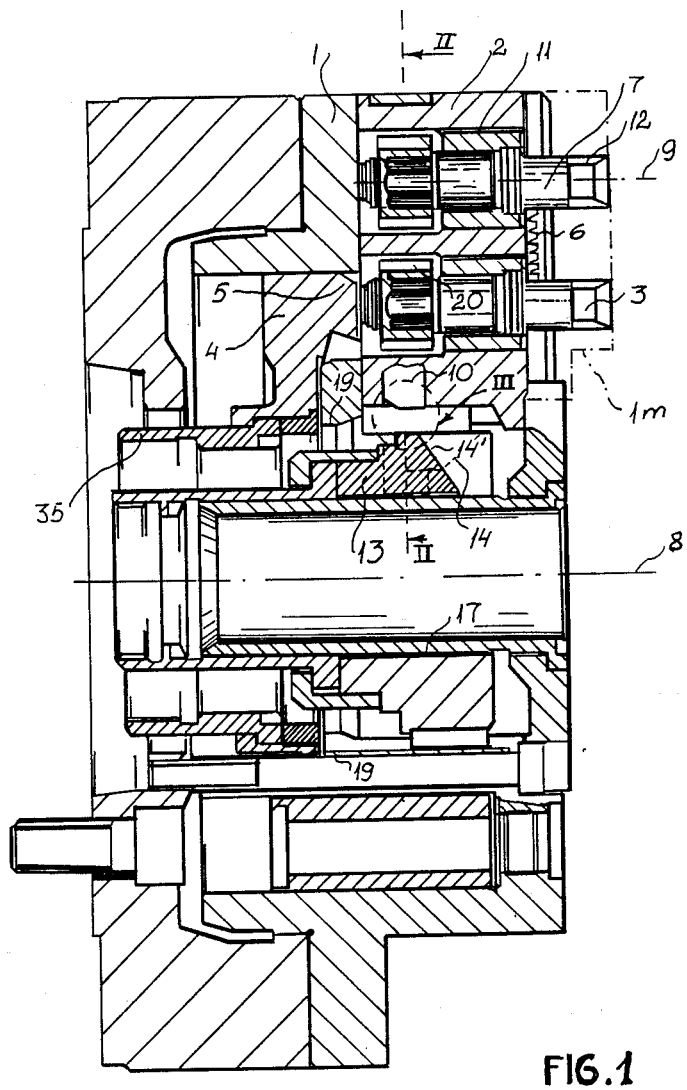
FIG. 1 is an axial cross sectional view through a chuck according to our invention.
Figure 2:
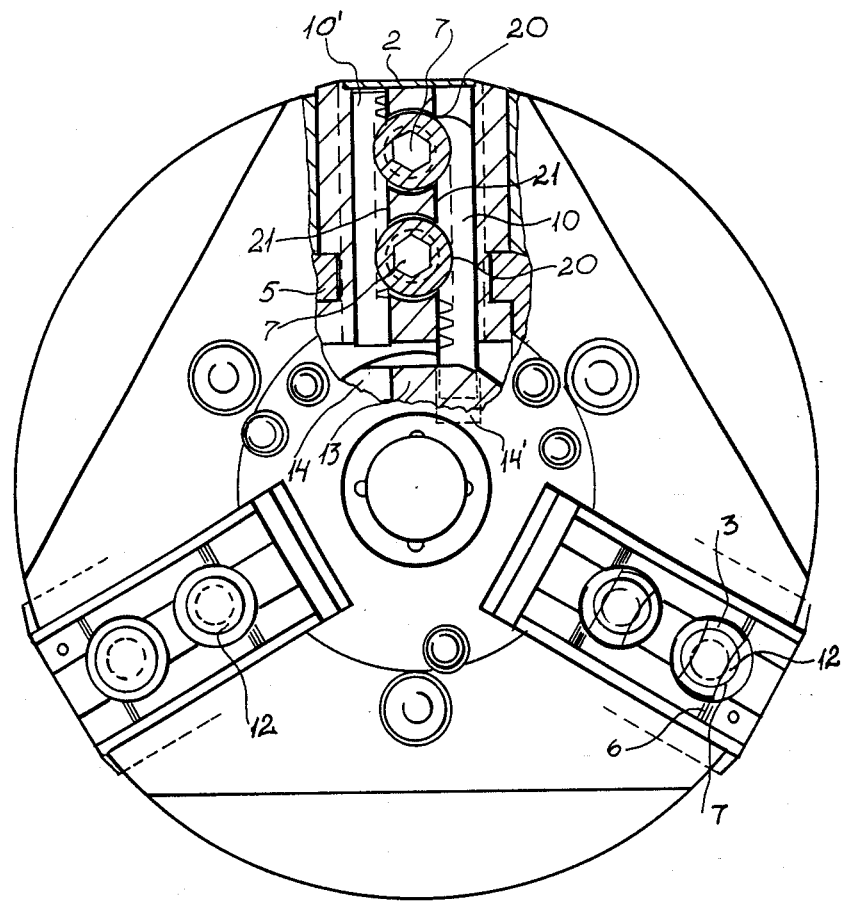
FIG. 2 is a partially front plan, partially cross sectional view taken along the line II—II of FIG. 1.

The power-driven chuck shown in FIGS. 1 and 2, which can be mounted in a conventional manner on the headstock spindle of a lathe or another machine tool, has three radially movable clamp jaws each of which comprises a drivable jaw base 2 guided in a chuck body 1 and a mounted jaw member 1m placed on the front surface of the jaw base 2 and shown in the drawing only in outline form for simplicity.

The driving of the jaw base 2 occurs by an axial drive member 4 slidable axially in the chuck body 1 using a wedge-hook drive of a standard form (see the above-mentioned applications). However understandably in the scope of our invention other positioning drives for the jaw base 2 are possible.

The replaceable jaw members can be constituted as described already in German Pat. No. 35 10 457 and are mounted interchangeably or removably on the jaw bases 2 so that the jaw bases 2 and the replaceable jaw members are in mutual engagement with a toothed strip or rack 6 with teeth running transverse to the guide direction of the jaw bases 2.

The connection between the replaceable jaw member and the jaw base 2 is effected by two connecting pins 7 with pin axes 9 parallel to the chuck axis 8. These connecting pins 7 are positioned beside each other with spacing in the adjusting direction of the jaw bases 2.

Each connecting pin 7 has a shank carrying a thread received in a threaded hole 11 in the jaw base 2. On the other end the connecting pins 7 each have a bolt head 12 which has two different dimensions in two different directions perpendicular to each other on the pin end and perpendicular to the pin axis.

In one direction the bolt head is small; in the other direction it is wider and in this direction forms a bolt shoulder 3 projecting outwardly over the pin shaft.

This bolt head 12 engages in a bolt recess provided in the replaceable jaw member so that the bolt head is inserted axially in the bolt recess in a rotary position of the connecting pin 7 corresponding to the unlocked configuration and in a rotary position rotated 90° to the rotary position corresponding to the locked configuration in which corresponds it is fastened behind an axially fitting undercut provided in the bolt recess. FIGS. 1 and 2 show the connecting pins 7 in their rotary positions corresponding to the locked configuration.

Further each connecting pin 7 has gear teeth 20 forming a pinion on a portion of it located in the jaw base 2.

Control rods 10, 10' guided in the jaw base 2 longitudinally slidable transverse to the pin axis 9 have transverse gear teeth 21 of the rack type meshing with the gear teeth 20 of the connecting pin 7 so that the sliding of the racks 10, 10' in their longitudinal direction leads to a corresponding rotary motion of the connecting pin 7. Should the connecting pin 7 be rotated into the locked configuration, it experiences an axial tightening by its threads 11 by which the replaceable jaw member is pulled back axially against the jaw base 2. At the same time the torque for rotation of the connecting pins 7 into the final locked configuration is considerably larger according to the axial tightening than is required for their low-force rotation with the connecting pins already or still locked.

The displacement of the racks 10, 10' in the jaw bases 2 is parallel to the displacement of the jaw bases 2 in the chuck body 1. For the control rods or racks 10, 10' a controlling member 13 is provided by which the control rods or racks 10, 10' can be fixed and prevented from sliding relative to the chuck body 1. The jaw bases 2 are slidable for rotation of the connecting pins 7 by their driving member 4 with their control rods 10, 10' fixed. As a result the displacement of the jaw base 2 can be used for rotation out from the locked configuration for locking the jaw member attachment or for rotating the connecting pins 7 strongly completely into the locked configuration with the fixed racks 10, 10' by the resulting relative shift between the racks 10, 10' and the base jaws 2.

In FIGS. 1 to 9 the controlling member 13 is a power-driven movable controlling member guided in the chuck body 1 transverse to the displacement direction of the racks 10, 10' and has at least one cam 14 extending along its adjusting path which forms a stop for the racks 10, 10' and by which the racks 10, 10' are slidable relative to the jaw base 2 fixed by its drive member 4 with a shift in the controlling member 13.

In the example according to FIGS. 1 to 3 the controlling member 13 is a control piston movable by an adjusting pipe 35 guided axially and concentrically in the chuck body 1.

Two racks 10, 10' movable in opposite directions and positioned adjacent and opposing the connecting pins 7 are provided. The controlling member 13 has an individual cam 14, 14', for each of the racks 10, 10'. These cams 14, 14' contact the one control rod 10' only during the locking process while they contact the other rack 10 only during the unlocking or releasing process at their radially inner rod ends.

As can be seen from FIG. 3 the cams 14, 14' and the contacting surfaces 14.1, 14.1' formed on them, which contact the racks 10, 10' in the always radially inwardly directed locking motion or releasing motion of the jaw base 2, have a radial spacing from the chuck axis 8 which above all (i.e. axially along the cams 14, 14' and the controlling member 13) is somewhat smaller than the smallest radial spacing of the jaw base 2 or the racks 10, 10' from the chuck axis 8 occuring in workpiece clamping.

In FIG. 3 the radially largest spacing of the jaw base 2 from the chuck axis 8 is indicated by the double arrow 16, the radially smallest spacing is indicated by the double arrow 22. The radial displacement indicated by the double arrow 15 which the jaw base 2 must perform for a strong making or release of the jaw member attachment is accordingly somewhat larger than the largest allowed clamping displacement of the jaw base 2.

The controlling member 13 is positioned in the chuck body 1 with a radial displacement play 17 for power balancing between the racks 10, 10' of all jaw bases 2 and is pushed into its completely retracted axial position corresponding to the completely released jaw member attachment in FIG. 1 in a central passage 19 in the chuck body 1 without radial play. This centering of the controlling member 13 causes the racks 10 to stand opposite their associated contacting surfaces 14.4 together in a corresponding radial position and thus all connecting pins 7 are rotated into a rotary position corresponding to their unlocked position so that the bolt head 12 can project into the replaceable jaw member.

The replaceable jaw member can thus be axially engaged by the connecting pins 7.

The contacting surface 14.1' on the cam 14' for the locking process correspond to a recess 14.2 for the free insertion of the end of the control rod 10 associated with it on the cam 14 for the unlocking process. The contacting surface 14.1 connecting to this recess 14.2 of the cam 14 is at least radially further out than the displacement corresponding to the double arrow 15 which the jaw base 2 must perform to release the jaw member attachment.

The cams 14,14' also have segments 14.3, 14.3' which are formed like planar wedge surfaces inclined toward the chuck axis 8. These segments contact the racks 10, 10' with correspondingly inclined stop surfaces 18,18'.

The operation of the chuck illustrated in FIGS. 1 and 2 is illustrated with the aid of FIG. 3. The control rod 10' causes the locking, the control rod 10 causes the unlocking.

The state illustrated in FIG. 3.1 corresponds to the unlocked or released configuration of the connecting pins 7. The control rod 10' acting to release is pushed radially interiorly and contacts the cam 14'.

Now if the controlling member 13 is pushed axially forward in the direction of the arrow 13.1, the control rod 10' is pushed radially toward the exterior until its rod end runs off the contacting surface 14.1' as is illustrated in FIG. 3.2.

Then the jaw base 2 is moved radially inwardly according to FIG. 3.3 as is indicated by the arrow 2.2. Hence, an additional relative motion of the control rod 10' and the jaw base 2 occurs with the result that the control rod 10' and the connecting pin 7 are completely pushed or rotated into their position corresponding to the locked configuration. Of course this occurs under high clamping force of the jaw base 2.

The jaw base 2 with the replaceable jaw member locked to it can be moved now radially by the replaceable jaw member for clamping a workpiece. The smallest clamping radius is somewhat smaller than the radius indicated by the double arrow 22 and is adjustable up to which the jaw bases 2 are movable in their radial displacement indicated by the double arrow 15 in strongly releasing and making the jaw member attachment. Thus on clamping the workpiece either the control rod 10' or the jaw base 2 can be pushed with their inner radial ends to the controlling member 13.

In this locking process the control rod 10 serving for releasing enters into the recess 14.2 as is indicated in FIG. 3 with the dot-dashed lines.

For releasing the jaw bases 2 are adjusted radially outwards to the largest radius 16 corresponding to the arrow 2.3 and subsequently the controlling member 13 is retracted axially corresponding to the arrow 13.2 so far that the end of the control rod 10 is located over the contacting surface 14.1. This state is illustrated in FIG. 3.4.

To then loosen the connecting pin 7 from its locked or engaged state, the jaw base 2 is moved radially inwardly in the direction of the arrow 2.4 according to FIG. 3.5 whereby the control rod 10 remains held on the contacting surface 14.1.

Hence, a relative motion occurs between the control rod 10 and the jaw base 2 under the high clamping force of the jaw base 2 which rotates the connecting pin 7 so far that its further rotation into the rotary position corresponding to the released position can occur without additional large expenditure of effort or application of a large force. The controlling member 13 which is retracted axially further in the direction of the arrow 13.3 according to FIG. 3.6 acts to do this.

The control rod 10 is movable radially outwards further until it sits on the contacting surface 14.4. Simultaneously the controlling member 13 is inserted into the central passage 19 so that all controlling rods 10 of the three jaw bases 2 occupy radially exactly the same position, also the connecting pins 7 are rotated completely into the released or unlocked state.

In this unlocked state the racks 10' serving for locking have been pushed radially inwardly as is indicated again with dot-dashed lines in FIG. 3.6. If the jaw base 2 is now moved with the control rod 10 again radially outwardly according to the arrow 2.5 into the position corresponding to the largest radius 16 the initial state illustrated in FIG. 3.1 results.

The embodiment of FIGS. 4 to 6 differs from that of FIGS. 1–3 described because each of the racks 10, 10' is doubled, namely each connecting pin 7 has its own control rod pair. These racks 10.1, 10.2 or 10.1', 10.2' are coupled with each other in the sliding direction by a force equalizing member 23 and not directly with each other but are controlled by the force equalizing member 23 through the controlling member 13 joining both racks.

The force equalizing member 23 is formed as an equal armed (two-arm) lever which is pivotally connected with the ends of its lever arms to both racks 10.1, 10.2 or 10.1', 10.2' and is connected rotatably about the lever center to a positioning rod 24 guided in the jaw base 2 parallel to the racks on which the controlling member 13 engages.

When the racks are acted upon only under pressure the force equalizing member 23 is braced on one end with a pressing nose 23.1 on the front side against each of both racks 10.1, 10.2 or 10.1', 10.2' and on the other end against the positioning rod 24 by a cylindrical surface 23.2 allowing its rotation.

Both racks 10.1, 10.2 or 10.1', 10.2' are guided directly on each other in the direction of the pin axis 9 and are provided each with a longitudinal cavity 25 which receives the pinion 20 on each control rod not engaged with it by the displacement of the control rod. It is thus guaranteed that both connecting pins 7 of each jaw base 2 are adjusted with equal force and completely until in their rotary position corresponding to the locked or unlocked configuration.

Figure 9:
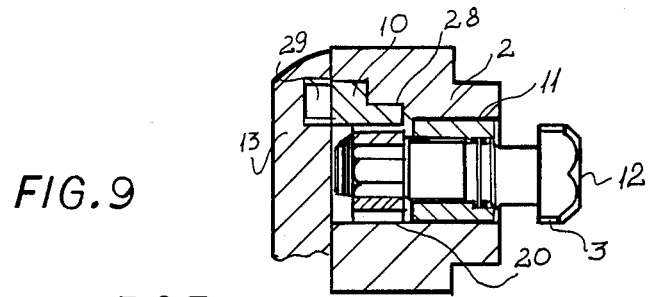
FIG. 9 is a cross sectional view taken along the section line IX—IX in FIG. 7 seen in the direction of the arrows.
Figure 7:
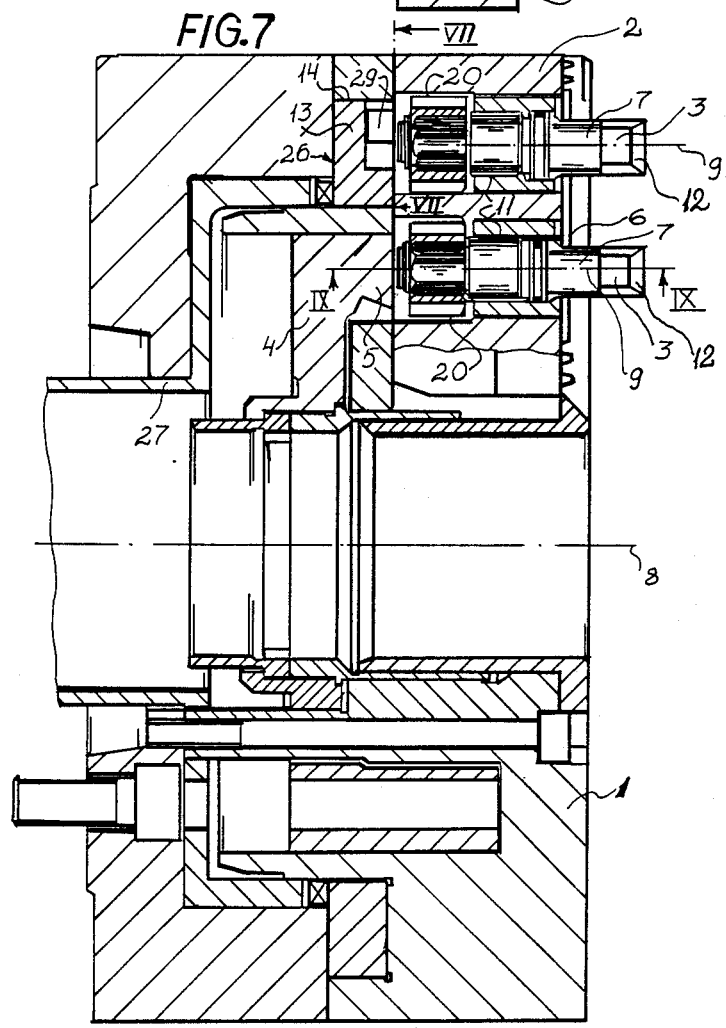
FIG. 7 is an axial cross sectional view through an additional embodiment of the chuck according to our invention.

In the embodiment of FIGS. 7 to 9 only a single individual control rod 10 is provided in each jaw base 2. The controlling member 13 is a ring disk which is mounted in a concentric circular slot 26 of the chuck body 1 rotatable about the chuck axis 8.

The rotation is driven by a positioning pipe 27 by an unshown hydraulic or pneumatic rotating piston. The circular slot 26 is open to the jaw base 2.

The control rod 10 on each jaw base 2 is guided in a rod groove 28 open to the circular slot 26. The ring disk has the cam 14 which contacts the control rod 10 with a contacting or stop piece 29 on the side facing the jaw base 2.

In the rotary position apparent from FIG. 8 the controlling member 13 forms an open passage for the contacting or stop piece 19 running in the guide direction of the control rod 10. In this rotary position the clamping motion of the jaw base 2 is not prevented by the controlling member 13. The cam 14 has two cam legs of which the cam leg 14a controls the locking motion and the other cam leg 14b the unlocking motion of the control rod in both rotation directions of the controlling member 13 in this open passage. Each of these cam legs 14a, 14b provides a stop surface 30a, 30b on which the control rod 10 is held fixed in the direction of the locking motion or the unlocking motion.

The operation of this chuck may be described as follows: For locking, the jaw base 2 travels inwardly so that the stop piece 29 of the control rod 10 travels from the position 29.1 to the position 29.2. Next the controlling member 13 is rotated right about the angle α whereby the stop piece 29 is pushed by the cam 14a from the position 29.2 to the position 29.4. Now the jaw base 2 travels outward so that the stop piece 29 and thus the control rod 10 are held fixed on the stop surface 30a. Hence, the connecting pins 7 are rotated by the large clamping force of the jaw base 2 into the locked configuration. The jaw member attachment is thus made.

If the controlling member 13 is now rotated about the angle α left into the initial position, the clamping motions for opening the jaw base 2 are again possible. For unlocking the jaw base 2 travels next outwardly whereby the stop piece 29 and correspondingly the control rod 10 reaches the position 29.3. The controlling member 13 pivots now about the angle β left so that the stop surface 30b arrives under the stop piece 29.

Subsequently the jaw base 2 travels inwardly so that the stop piece 29 and thus the control rod 10 are held on the stop surface 30b so that the connecting pins 7 are released from their locked configuration under the large clamping force of the jaw base 2.

The controlling member 13 now rotates further left about the angle α whereby the stop piece 29 and thus the control rod 10 arrives over the cam 14b in the position 29.1 from the position 29.3. By these steps the control rod 10 pivots the connecting pins 7 into their rotary position corresponding to the completely unlocked configuration and releases the replaceable jaw member. Subsequently the controlling member 13 can be rotated back about the angle β and α right into the initial position.

Figure 10:
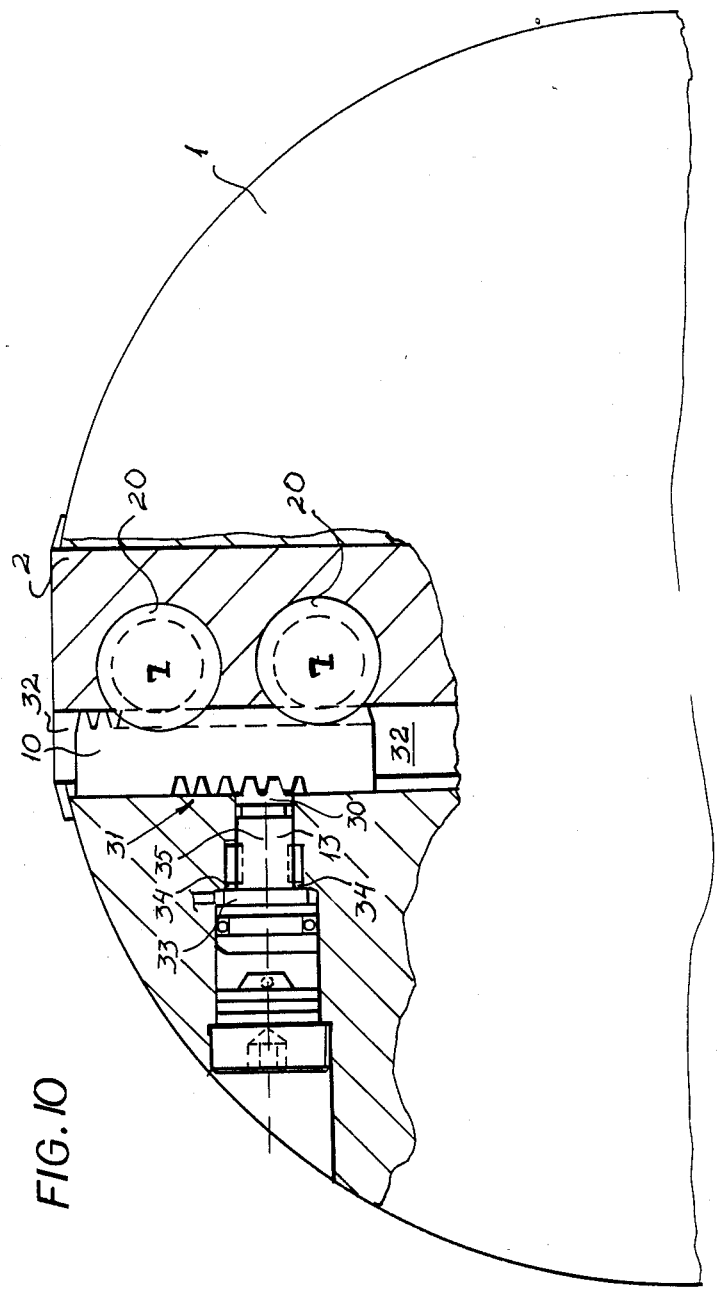
FIG. 10 is a partially cutaway, partially front view of yet another embodiment of a chuck according to our invention.

In the embodiment of FIG. 10 the controlling member 13 is a lock bolt guided in the chuck body 1 which engages with a bolt head 30 which fits in a lock bolt receptacle 31 of the control rod 10 oriented transversely to its displacement direction in the locked configuration indicated in the drawing. In particular the control rod 10 is guided in a linear groove 32 of the jaw base 2 opening into the chuck body 1 and is provided with a toothed strip forming the bolt receptacle 31 on the side of the linear groove opening into the chuck body.

The lock bolt 13 is a cylindrical bolt slidable to and fro in its longitudinal direction power-driven by a hydraulic or pneumatic piston 33. The lock bolt is secured by lateral guide lugs which run in corresponding lug slots 34 of the chuck body 1 against rotation about its axis 35 so that the front of it facing the control rod 10 acting as bolt head 30 is equipped with transverse gear teeth fitting the toothed strip continuously according to the shape of the teeth on the toothed strip.

The operation of this embodiment may be briefly described as follows: For locking the jaw base 2 travels into the extreme position. The controlling member 13 is moved to the control rod 10 by the power piston 33 into the engaged position indicated in the drawing. Subsequently the jaw base 2 travels radially inwardly approximately the largest possible clamping displacement so that the control rod 10 is held fixed by the controlling member 13 so that a relative motion between the control rod 10 and the jaw base 2 occurs. The connecting pins 7 rotate in the direction of rotation corresponding to the locking motion. Now the controlling member 13 operated by the piston 33 returns from engagement and releases the control rod 10. In this condition the jaw base 2 returns to the extreme position and takes the control rod 10 along so that no back rotation of the connecting pins 7 result. The described operation can now be repeated whereby an additional relative motion of the control rod 10 and the jaw base 2 in the sense of a locking motion of the control rod 10 results. This repetition is performed so often that the connecting pins 7 are rotated from their unlocked configuration about 90° into their locked configuration. The unlocking process is effected correspondingly in reverse sequence.

We claim:

1. In a power-driven chuck with a plurality of clamp jaws radially adjustable by a drive member, each of said clamp jaws comprising a jaw base operable by said drive member guided in a chuck body and a mounted jaw member removably attached to said jaw base and having at least one connecting pin with a pin axis parallel to the chuck axis which is mounted rotatable about said pin axis in said jaw base and which releases or makes a jaw member attachment between said jaw base and said mounted jaw member defined in the rotary position, at least one control rod guided longitudinally slidably in said jaw base transverse to said pin axis and a plurality of gear teeth coupling said control rod and said connecting pin with each other are provided so that the motion of said control rod relative to said jaw base converts into a rotation of said connecting pin and vice versa the improvement wherein the displacement of said control rod in said jaw base runs parallel to the displacement of said jaw base in said chuck body, a controlling member is provided for said control rod by which said control rod is fixed in regard to said motion in said chuck body and said jaw base is slidable by said drive member with said control rod fixed to rotate said connecting pins.

2. The improvement defined in claim 1 wherein two of said connecting pins are provided for each of said clamp jaws and an individual one of said racks is provided for each of said connecting pins and both of said racks are coupled with each other by a power balancing member and are lockable by said power balancing member by said controlling member joining said racks.

3. The improvement defined in claim 2 wherein said power balancing member is an equal armed lever which is attached with both of said racks, which is pivotally attached at an end of a lever arm of said lever with each of said control rods and which is connected rotatable about a center of said lever to a positioning rod on which said controlling member engages guided parallel to said racks in said jaw base.

4. The improvement defined in claim 3 wherein with said racks always under pressure said power balancing member is braced against a positioning rod on one end by a cylindrical surface allowing rotation and on another end with a front pressing nose pressing against each of said racks.

5. The improvement defined in claim 3 wherein said gear teeth coupling said control rod with said connecting pin comprise a pinion on said connecting pin and a toothed strip or rack engaging said pinion on said control rod and each of said controlling rods are guided directly to each other in the direction of said pin axis and each have a longitudinal cavity which receives said pinion not in engagement with said control rod.

6. The improvement defined in claim 1 wherein said controlling member is a lock bolt guided in said chuck body which engages in a locked configuration with a bolt head fitting under pressure in a lock bolt receptacle of said rack tranverse to a displacement direction of said rack.

7. The improvement defined in claim 6 wherein said rack is guided in a substantially linear groove of said jaw base opening into said chuck body and is provided with a toothed strip forming said lock bolt receptacle on the side of said linear groove opening into said chuck body and said lock bolt is power-driven slidable to and fro longitudinally, the front of said lock bolt on the side facing said rack being formed as a lock bolt head having a plurality of transverse gear teeth fitting in said toothed strip.

8. The improvement defined in claim 1 wherein said controlling member is power-driven and movable guided transverse to a displacement direction of said rack in said chuck body, said controlling member having a cam extending longitudinally along the path of motion of said controlling member which forms a stop for one of said racks or said positioning rod and by which said rack is slidable relative to said jaw base held fixed by said drive member on adjusting said controlling member.

9. The improvement defined in claim 8 wherein said controlling member is a ring disk which is mounted so as to be pivotable about said chuck axis in a concentric circular slot of said chuck body, in each of said jaw base said rack is guided in a rod groove opening into said concentric circular slot and said ring disk has said cam which contacts said rack with a stop piece on a side facing said jaw base.

10. The improvement defined in claim 9 wherein said controlling member forms an open passage for said stop piece running in said displacement direction of said rack in a predetermined rotary position, said cam having two cam legs in said open passage in each of two rotation directions, one of said cam legs controlling a locking motion while the other controls an unlocking motion of said rack and each of said cam legs having a stop surface on which said rack is held fixed in the direction of said locking motion or said unlocking motion.

11. The improvement defined in claim 8 wherein said controlling member is a control piston guided concentrically and axially in said chuck body and two of said racks or position rods movable oppositely to each other positioned opposite each other on said connecting pins are provided for each of said jaw bases and said controlling member has an individual one of said cams for each of said racks or said positioning rods, one of said cams contacting one of said racks or said positioning rods only during the locking process, the other of which contacting one of said racks or said positioning rods during the unlocking process with the radially interior ends of said racks or said positioning rods.

12. The improvement defined in claim 11 wherein said cams and said contacting surfaces formed on said cams, which contact said racks or said positioning rods during a radially directed inward locking or unlocking motion of said jaw base, have a radial spacing of said chuck axis which is somewhat smaller than the smallest spacing from said chuck axis occuring on clamping a workpiece.

13. The improvement defined in claim 11 wherein said controlling member is positioned in said chuck body with a radial sliding play for power balancing between said racks or said positioning rods of all of said jaw bases and is only pushed into an axial position corresponding to a completely released one of said jaw connections in a central passage in said chuck body preventing said radial sliding play.

14. The improvement defined in claim 11 wherein said contacting surface on one of said cams for said locking process or for said unlocking process corresponds to a recess for receiving an end of said rack associated therewith and said contacting surface of another of said cams connected to said recess is radially further out at least that displacement which said jaw base must perform to release said jaw member attachment.

15. The improvement defined in claim 11 wherein said cams have segments formed like planar wedge surfaces inclined toward said chuck axis which contact an end of said racks or said positioning rods with suitably inclined surfaces.

16. A power-driven chuck comprising:
a chuck body;
a plurality of clamp jaws radially adjustable by a drive member, each of said clamp jaws comprising a jaw base operable by said drive member guided in a chuck body and a mounted jaw member removably attached to said jaw base;
at least two connecting pins for each of said clamp jaws each with a pin axis parallel to the chuck axis which are mounted rotatable about said pin axis in said jaw base and which release or make a jaw member attachment between said jaw base and said mounted jaw member defined in rotary position;
at least one control rod for each of said connecting pins guided longitudinally slidably in said jaw base transverse to said pin axis, the displacement of said control rod in said jaw base running parallel to the displacement of said jaw base in said chuck body;
a plurality of gear teeth coupling said control rod and said connecting pin with each other so that the motion of said control rod relative to said jaw base converts into a rotation of said connecting pin and vice versa;
a controlling member for said control rod by which said control rod is fixed in regard to said motion in said chuck body and said jaw base is slidable by said drive member with said control rod fixed to rotate said connecting pins; and
a power balancing member coupling both of said racks with each other, said racks being lockable by said power balancing member by said controlling member joining said racks, said power balancing member being an equal armed lever which is attached with both of said racks, which is pivotally connected to an end of a lever arm of said lever and which is connected so as to be rotatable about a center of said lever to a positioning rod on which said controlling member engages guided parallel to said racks in said jaw.

* * * * *